Aug. 26, 1952     H. A. JONES     2,608,082
AUTOMATIC WASHING MACHINE CONTROL
Filed June 19, 1948     3 Sheets-Sheet 1

Inventor:
Harold A. Jones,
by Alfred E. Robst
His Attorney.

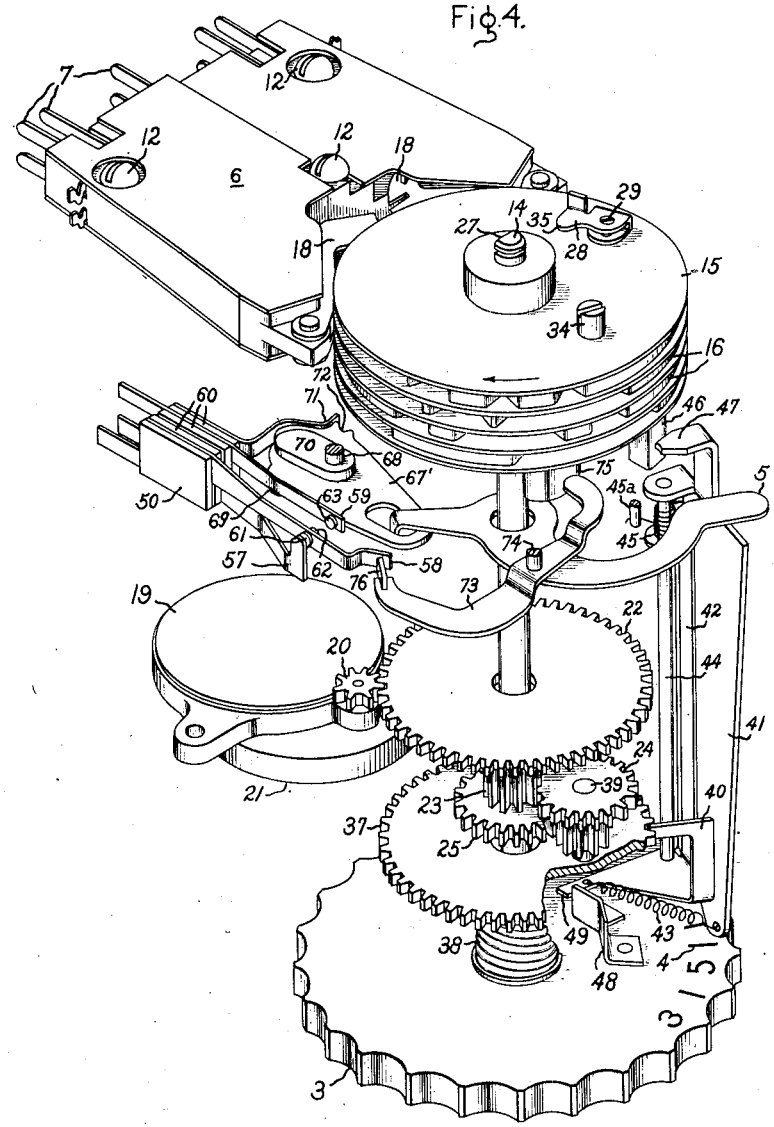

Patented Aug. 26, 1952

2,608,082

UNITED STATES PATENT OFFICE 2,608,082

AUTOMATIC WASHING MACHINE CONTROL

Harold A. Jones, New Hyde Park, N. Y., assignor to General Electric Company, a corporation of New York Application June 19, 1948, Serial No. 33,943

4 Claims. (Cl. 68—12)

My invention relates to controls for a sequence of operations and more particularly to mechanisms for controlling a series of operations of automatic washing machines.

It is an object of my invention to provide an improved control for a sequence of operations including provision for adjusting the duration of one of the operations.

It is another object of my invention to provide an improved control including a single motor for driving both a sequential control and an interval control.

It is a further object of my invention to provide an improved control including an arrangement for permitting manual reversal of the sequential control.

It is still another object of my invention to provide an improved control for a sequence of operations including provision for automatically actuating a water temperature switch.

Further objects and advantages of my invention will become apparent as the following description proceeds and the features of novelty which characterize my invention will be pointed out with particularity in the claims annexed to and forming a part of this specification.

Figure 2:
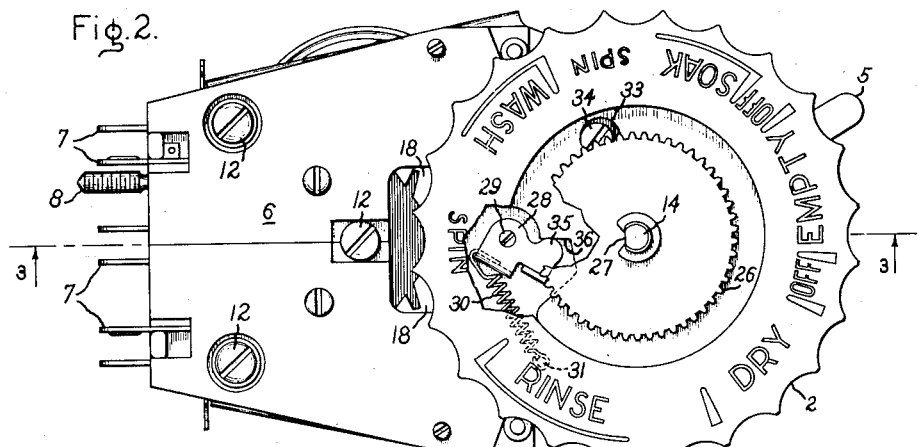
Figure 3:
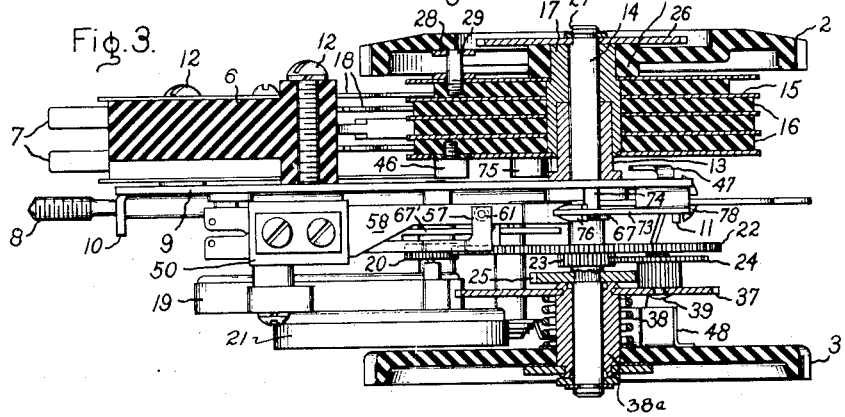
Figure 1:
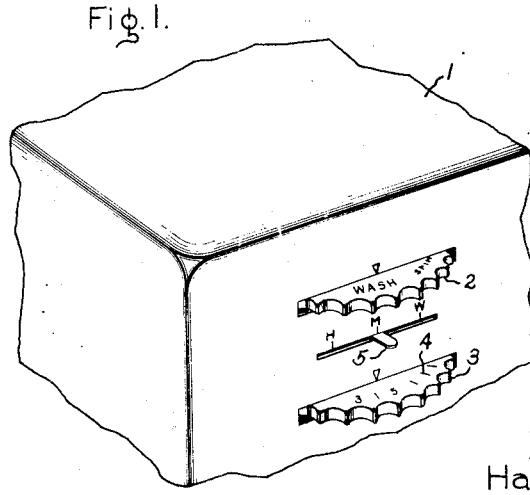
Figure 9:
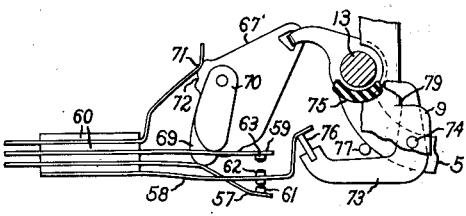
Figure 10:
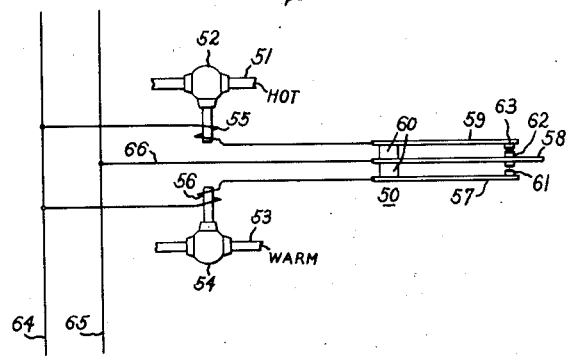

For a better understanding of my invention reference may be had to the accompanying drawings in which Fig. 1 is a perspective view of a portion of an automatic washing machine cabinet incorporating the control; Fig. 2 is a plan view of the control, partially broken away; Fig. 3 is a sectional elevation view of the control taken along the line 3—3 of Fig. 2; Fig. 4 is an exploded view showing details of the control; Fig. 5 is a view in another position of a portion of the control shown in Fig. 4; Figs. 6, 7, 8, and 9 show elements of the water temperature switch in four different positions; and Fig. 10 is a partial circuit diagram illustrating the operation of the water temperature switch.

Referring to Fig. 1, there is shown a portion of the cabinet 1 of an automatic washing machine. The cabinet is provided near one corner with three openings. Through one of these openings projects a rotatable knob or element 2, which is utilized for setting the sequential control of the washing machine to the desired operation in the sequence of operations. The knob 2 is provided with a suitable inscription to indicate the particular operation for which the machine is set and to indicate the operation being performed by the machine. A second knob or element 3 projects through another opening in the cabinet 1, and this knob is utilized for setting an interval control to vary the duration of one of the operations; for example, this knob is shifted to vary the duration of the washing operation. Suitable indicia 4 are provided on the knob 3 to indicate the number of minutes for which the washing operation is set. A lever 5 projects through the third opening in the cabinet 1. This lever may be set to any one of three positions to adjust the temperature of the water supplied to the machine to "warm," "medium," or "hot."

Referring now to Figs. 2, 3, and 4, the control includes a switch assembly 6 which includes a plurality of switches (not shown). The switch assembly may be of the general type described and claimed in U. S. Patent 2,481,333, granted September 6, 1949, to Heber L. Newell, and assigned to the same assignee as the present invention. A plurality of plug terminals 7 project from the end of the switch assembly 6 and are adapted to be received within corresponding receptacles (not shown) within the washing machine cabinet. A threaded rod 8 extends beyond the end of the switch assembly 6 and is adapted to be received within a screw-threaded opening (not shown) within the washing machine cabinet for holding the control structure in position.

A mounting bracket 9 is provided for supporting the control structure, the rod 8 extending through openings in flanges 10 and 11 of the mounting bracket. The switch assembly 6 is secured to this bracket by a plurality of screws 12 or other fastening devices. A bearing 13 is secured within an opening in the mounting bracket 9. This bearing includes a longitudinal opening for receiving a shaft 14, the shaft 14 providing a common mounting element for various portions of the control, as will be explained hereinafter. A control drum 15 including a plurality of adjacent cam disks 16 is mounted for rotation about the shaft 14. The drum 15 includes a hub 17 which is arranged to revolve freely on the shaft 14. The cam disks 16 engage a plurality of cam followers 18 for sequentially actuating the switches included within the switch assembly 6 in order to provide a sequential control for the washing machine.

In order to drive the sequential control a constant speed motor 19 is provided. The motor drives a pinion 20 through a gear reduction unit 21. Motion is transmitted from the pinion 20 through a gear train including a gear 22, a pinion 23, a planetary gear and pinion 24, and a gear 25 to the shaft 14. The gear 25 is fixed to the shaft 14. The gear 22 and the pinion 23 are fixed to each other. A gear or ratchet wheel 26 is mounted at the upper end of the shaft, the central opening in the gear 26 having a flat side adapted to engage a flat portion 27 of the shaft, so that the gear 26 is driven as the shaft rotates. In order to transmit rotation of the gear 26 to the control drum 15 and to the knob 2 a pawl 28 is mounted on the drum by a pin 29, which forms a pivot for the pawl. The pawl is biased into engagement with the gear 26 by a tension spring 30. One end of the spring 30 is connected to the pawl 28 and the other end is secured to a pin 31 which is fixed to the underside of the knob 2. As best shown in Fig. 2, when the gear 26 is driven in a clockwise direction by the motor 19 the teeth of the gear engage the pawl 28 and drive the drum 15 of the sequential control. The knob 2 includes a hub 32 which fits loosely on the hub 17 of the drum 15 and is carried along with the drum when the latter is driven by the motor 19, so that the knob 2 at all times indicates the operation being performed by the washing machine.

When the sequential control is to be set by the knob 2, the knob is normally moved in a clockwise direction so that the pawl 28 rides freely over the teeth of the gear 26 permitting manual shifting of the knob 2 and of the drum 15. During such clockwise shifting of the knob 2 the portion of the knob adjacent an opening 33 therein comes into contact with a pin 34, which is secured to the drum 15. Thus clockwise movement of the knob 2 is transmitted through the pin 34 to the drum 15 and effects setting of the sequential control.

It is sometimes desirable to shift the control in a reverse direction, for example, in order to repeat an operation. This would normally be prevented by engagement of the pawl 28 with the teeth of the gear 26. In order to permit such reverse rotation of the knob 2 and of the drum 15 the pawl 28 is provided with a portion 35 which is received within a recess 36 formed in the knob 2. During the initial manual movement of the knob in a counterclockwise direction the portion of the knob adjacent the recess 36 forces the pawl in a clockwise direction against the tension of the spring 30. This moves the pawl out of engagement with the gear 26 and permits shifting of the drum 15 in a reverse, that is, counterclockwise, direction.

The aforementioned sequential control clutch and drive arrangement is described and claimed in my co-pending divisional application S. N. 241,476, filed August 11, 1951.

In order to vary the duration of the washing operation, an interval control is provided. This interval control includes the setting knob 3. The knob 3 engages a gear 37 through a friction clutch formed by a spring 38. The gear is fixed to a hub 38a, which is free to move relative to the shaft 14. The setting knob 3 is mounted on, but may rotate relative to, the hub 38a. The planetary gear and pinion 24 is mounted on the gear 37 by a pin 39, so that movement of the planetary gear and pinion 24 about the axis of the pinion 23 and the axis of the gear 25 effects rotation of the gear 37. In order to prevent rotation of the gear 37 a stop structure or assembly including a spring-biased stop 40 is arranged to engage the gear 37. This stop assembly includes two elements 41 and 42, biased together by a tension spring 43. The stop assembly is pivoted on a rod 44, which is supported from the mounting bracket 9, and is biased into engagement with the gear 37 by a torsion spring 45. One end of the torsion spring 45 engages the stop element 41 and the other end engages a post 45a, which is secured to the mounting plate 9.

During the major portion of the operating cycle of the washing machine the stop 40 is retained in engagement with the gear 37 by the spring 45. This maintains the gear 37 stationary and thereby prevents movement of the pin 39 which forms the axis of the planetary gear and pinion 34. Accordingly, as the motor 19 drives the pinion 20 in a counterclockwise direction, this motion is transmitted through the gear 22 and the pinion 23 to the planetary gear and pinion 24. Since the axis of the planetary gear and pinion is maintained stationary, this gear cannot roll about the pinion 23 and the gear 25, and it therefore drives the gear 25 in a clockwise direction. This results in clockwise motion of the gear 26, which, like the gear 25, rotates with the shaft 14. The gear 26 engages the pawl 28 and thereby drives the drum 15 to effect the sequential operations of the washing machine and also drives the knob 2 to indicate the particular operation being performed by the machine at any time.

The drum 15 includes a depending cam element 46, which is adapted to engage a lip 47 of the element 41 of the stop assembly. This cam element is so placed on the drum structure that it comes into engagement with the lip 47 as the sequential control reaches the washing operation. The cam element 46 forces the stop element 41 outwardly against the bias of the spring 45, and the tension spring 43 carries the stop element 42 along with the element 41. This moves the stop 40 out of engagement with the gear 37 and permits rotation of that gear. With the stop 40 disengaged, the resistance to the movement of the gear 37 and the remaining elements of the interval control is substantially less than the frictional resistance offered by the plurality of switches in the switch assembly 6 to the movement of the sequential control. Under these circumstances the motor 19 drives the interval control in preference to the sequential control. This drive may be traced from the pinion 20 through the gear 22, the pinion 23 to the planetary gear and pinion 24. With the gear 37 free to revolve the planetary gear and pinion 24 rolls around the pinion 23 and the gear 25 in a counterclockwise direction carrying the gear 37 in a counterclockwise direction. Motion of the gear 37 is translated into similar motion of the knob 3 through the spring clutch 38, so that indicia 4 on the knob 3 indicate the time remaining of the washing operation.

With the sequential control immobilized the washing operation continues during this period for any time set by the interval control. In order to permit the setting of the duration of the washing operation by the interval control, a limiting element 48 is provided on the upper side of the knob 3. As the knob 3 is rotated in a counterclockwise direction the limiting element 48 ultimately engages an ear 49 of the stop element 42. Further counterclockwise rotation of the knob 3 then forces the stop element 42 in a clockwise direction against the bias of a tension spring 43, bringing the stop 40 again into engagement with the teeth of the gear 37. During this time the stop element 41 is still held outwardly by the cam element 46. When the stop 40 engages the gear 37 the axis of the planetary gear and pinion 24 is again held stationary and the planetary gear and pinion 24 drives the sequential control as previously described. During the resulting movement of the sequential control the cam element 46 moves past the lip 47, and the spring 45 moves the stop element 41 against the stop element 42 to return the overall stop structure to the condition originally described.

To set the duration of the washing operation the setting knob 3 is moved in a clockwise direction by any desired amount, thereby spacing the limiting element 48 any desired distance from the ear 49 of the stop element 42. This setting knob moves freely relative to the shaft 14 and motion relative to the gear 37 is permitted by slippage of the spring clutch 38. The washing time may be set or varied at any time during the operation of the machine including variation, if desired, while the washing operation is being performed.

For various operations and for various materials to be washed, water of a different temperature may be required. In order to permit variation of the temperature of the water, a water temperature switch 50 is provided. This switch is shown diagrammatically in Fig. 10 and in detail in Fig. 4. Referring to Fig. 10, "hot" water is supplied to the washing machine through a conduit 51 controlled by a solenoid-operated valve 52. "Warm" water is supplied to the washing machine through a conduit 53 controlled by a solenoid-operated valve 54. The water temperature switch 50 controls the energization of solenoids 55 and 56 for opening the valves 52 and 54, respectively. When both valves are opened simultaneously, a mixture of "hot" and "warm" water, that is "medium" water, is supplied to the machine.

The water temperature switch includes three blades or arms 57, 58, and 59 spaced by insulating blocks 60. These blades include contacts 61, 62, and 63 respectively, the contact 62 extending on both sides of the blade 58 so as to be susceptible of engagement with both the contacts 61 and 63. Power for energizing the solenoids 55, 56 is supplied from lines 64, 65. The line 65 is connected through a line 66 to the central blade 58 of the switch 50. One terminal of the solenoid 55 is connected to the line 64 and the other terminal is connected to the switch blade 59. Similarly, one terminal of the solenoid 56 is connected to the line 64 and the other terminal is connected to the switch blade 57. Thus when contacts 61 and 62 alone are in engagement only the solenoid 56 is energized and "warm" water is supplied to the machine. When only the contacts 62 and 63 are in engagement, the solenoid 55 alone is energized and "hot" water is supplied to the machine. When contacts 61 and 62 and also contacts 62 and 63 are in engagement both solenoids are energized and a mixture of "hot" and "warm" water, that is "medium" water, is supplied to the machine.

Referring to the detailed illustrations of the water temperature switch shown in Fig. 4 and in Figs. 6–9, the switch may be set by the lever 5 in any one of three positions, to supply "warm," "medium" or "hot" water to the machine. The lever 5, which projects through an opening in the front of the cabinet, is mounted on the shaft 14, but is free to move about the shaft, being held between the bearing 13 and a collar 67. The lever 5 engages a cam 67' which is pivotally secured to the mounting bracket 9 by a pin 68. The cam includes a cam block 69 which is adapted to engage the blade 57 of the switch 50 and a second cam block 70 which is adapted to engage the blade 59. A resilient detent 71 is provided for engaging teeth 72 in the cam 67' so as to hold the cam in any one of the three possible positions.

Figure 6:
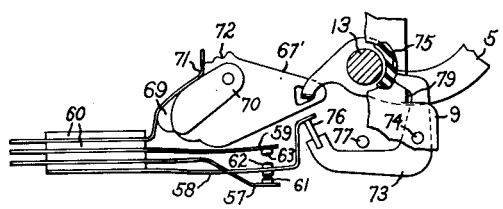

In Figs. 4 and 6 the water temperature switch is shown in its "warm" water position. Under these circumstances the lever 5 is in its extreme counterclockwise position, as viewed in these figures, that is, to the extreme right as viewed in Fig. 1. The blades 57, 58, and 59 are unaffected by the cam blocks 69 and 70 in this position of the lever 5. Under these circumstances the contacts 61 and 62 of the blades 57 and 58 respectively are in engagement and the contacts 62 and 63 of the blades 58 and 59 respectively are disengaged. The blades 57, 58, and 59 are made of a resilient material and are so arranged that the contacts 61 and 62 are normally biased into engagement by the natural resilience of the blades 57 and 58, and similarly the contacts 62 and 63 are normally biased apart by the natural resilience of their respective blades.

Figure 7:
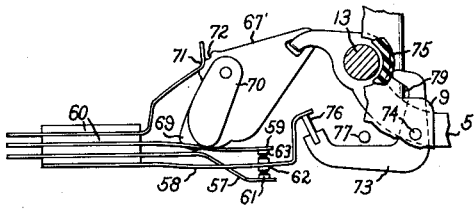

To set the switch for "medium" water, the lever 5 is moved one step clockwise to the position shown in Fig. 7, corresponding to the central position of the lever, as viewed in Fig. 1. This shifts the cam 67' one step in a counterclockwise direction, and the cam block 70 then presses against the blade 59 to position the contact 63 closely adjacent the contact 62. Thus in this position contacts 61 and 62 remain in engagement, and contact 63 is positioned sufficiently close to contact 62 that it can be brought into positive engagement by means of a cam-operated pivoted lever 73 to be described hereinafter. The above relation between the contacts 62 and 63 is shown in Fig. 9. The cam block 69 has not moved sufficiently to affect the position of blade 57.

Figure 8:
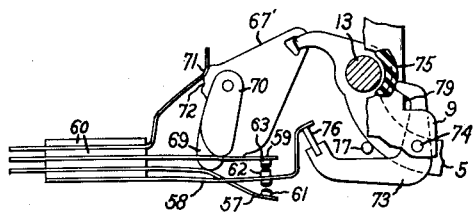

To set the machine for "hot" water the lever 5 is moved an additional step in a clockwise direction to the position shown in Fig. 8, corresponding to the extreme left position of the lever as viewed in Fig. 1. In this position of the lever the cam element 70 remains in engagement with the blade 59 and continues to position the contact 63 closely adjacent the contact 62. The cam block 69 presses against the blade 57. This limits movement of the blade 57 toward the blade 58 so that when the blade 58 is moved by the pivoted lever 73, as will be explained hereinafter, the blade 57 is unable to follow and the contacts 61 and 62 are disengaged. Figure 8 illustrates this latter relationship between contacts 61 and 62.

It can be seen from the above description that in all three positions of the lever 5 the contacts 61 and 62 are maintained in engagement and the contact 63 is maintained either substantially spaced from the contact 62 (in the "warm" water position) or merely closely adjacent to the contact 62 (in the "medium" and "hot" water positions). Thus, as can be seen by reference to the circuit diagram shown in Fig. 10, only warm water is permitted to enter the machine under these circumstances. This condition prevails during the "soak" and "rinse" operations of the machine. In order to permit water of the desired temperature to enter the machine during the "wash" operation the cam-operated pivoted lever 73 is provided. This lever is mounted on the mounting bracket 9 by a pin 74 and is biased in a counterclockwise direction by the resilience of blade 58. In order to actuate the lever 73 during the wash operation a cam element 75 is provided on the drum 15. At the beginning of the "wash" operation the cam element 75 comes into engagement with the pivoted lever 73 and moves the lever in a clockwise direction. This forces an insulating block 76 held on the end of the lever 73 against the end of the blade 58, pressing the blade 58 away from the blade 57 and toward the blade 59.

Where the lever 5 has been set in the "warm" position, as shown in Fig. 6, the shifting of the lever 73 by the cam element 75 has no effect on the temperature of the water, since the contact 63 is spaced sufficiently far from the contact 62 that the small movement of the pivoted lever 73 by the cam element 75 is insufficient to move the contacts 62 and 63 into engagement. The contacts 61 and 62 remain in engagement since the blade 57, which is unaffected in this position by the cam block 69, follows the movement of the blade 58.

Should the lever 5 be set to the "medium" position, as shown in Fig. 7, wherein the contact 63 is spaced closely adjacent to the contact 62, the small movement of the pivoted lever 73 is sufficient to bring the contact 62 into engagement with contact 63. At the same time the blade 57 follows the movement of the blade 58 and contacts 61 and 62 remain in engagement. Under these circumstances "medium" water is supplied for the washing operation, as can be seen by reference to the circuit diagram shown in Fig. 10.

Should the lever 5 have been set to the "hot" water position, as shown in Fig. 8, the cam block 69 limits movement of the blade 57 so that it is unable to follow the movement of the blade 58. Consequently, the movement of the lever 73 under these circumstances effects a disengagement of the contacts 61 and 62. At the same time the contact 63, as in the "medium" water position, is positioned closely adjacent the contact 62 and movement of blade 58 by the lever 73 effects engagement of contacts 62 and 63. This results in the supplying of "hot" water for the washing operation. In the "hot" water position, the lever 5 engages a pin 77, which is secured to the mounting bracket 9, and further movement of the lever 5 in a clockwise direction is prevented. Counterclockwise movement of the lever 5 is limited by engagement of the lever with the head 78 of the screw-threaded rod 8.

It will be noted from Figs. 7 and 8 that the contacts 62 and 63 are shown in engagement in the "medium" and "hot" positions of the lever 5, while the foregoing description mentions that the contacts 62 and 63 are merely spaced closely adjacent to each other in these two positions of the lever 5. This is explained by the fact that Figs. 6, 7, and 8 show the lever 73 in the position it occupies during the "wash" operation of the machine, that is, in engagement with the cam element 75. This results in an upward movement of the blade 58 bringing the contacts 62 and 63 into engagement in the position shown in Figs. 7 and 8. During the other operations of the machine the lever 73 is not engaged by the cam element 75 and is forced by the resilience of the switch blade 58 in a counterclockwise direction against a stop 79 formed on the mounting plate 9. The stop 79, by limiting the movement of the lever 73, also limits the downward movement of the blade 58, and determines the position of this blade during all operations of the machine except the "wash" operation. It can be seen that during these other operations the switch blade 58 and its contact 62 will occupy a position somewhat lower than shown in Figs. 6, 7, and 8, that is, the position illustrated in Fig. 9. Under these conditons there is a slight gap between contacts 62 and 63 in the "medium" and "hot" water positions. Accordingly, as explained previously, contacts 62 and 63 are not in engagement regardless of the position of the lever 5, during these other operations, and only warm water can be supplied to the machine. This is illustrated in Fig. 9, wherein the lever 5 is in the "hot" water position, and wherein the lever 73 is unaffected by the cam element 75. During the "wash" operation, with the lever 5 in the "hot" water position, the movement imparted to the switch blade 58 by the clockwise movement of lever 73 shifts the contact 62 into engagement with the contact 63 and disengages contacts 61 and 62, as shown in the relationship of the various parts illustrated in Fig. 8. The above-described arrangement permits the supplying of "medium" water to the machine when the lever 5 occupies the position shown in Fig. 7 and "hot" water when the lever 5 occupies the position shown in Fig. 8.

While I have shown and described a specific embodiment of my invention I do not desire my invention to be limited to the particular constructions shown and I intend, by the appended claims, to cover all modifications within the spirit and scope of my invention.

What I claim as new and desire to secure by Letters Patent of the United States is:

1. In combination with a sequential control for an automatic washing machine, a switch for controlling the temperature of water supplied to said machine, said switch including three resilient switch arms each having a contact thereon, a cam for positioning two of said arms, lever means comprising two surfaces for respectively setting said cam in any one of three positions, a first one of said contacts being biased in engagement with a second of said contacts and spaced from the third contact in all three positions of said lever, electro-responsive means responsive to the engagement of said first and second contacts to supply water of only one temperature to said machine regardless of the position of said lever, and means actuated by said sequential control for moving one of said switch arms to bring said second and third contacts into engagement, a second electro-responsive means energized in response to the engagement of said second and third contacts to supply water of another temperature to said machine in two of the positions of said lever.

2. In combination, a sequential control for an automatic washing machine, means for driving said sequential control to carry out a plurality of operations including a washing operation, a switch, a first and a second electro-responsive means controlled by said switch for controlling the flow of water of relatively high and low temperatures respectively to control the temperature of water supplied to said machine during said operations, said switch including a first resilient, a second resilient, and a third resilient switch arm, cam means movable to at least a first and a second position in which the position of said first switch arm and in which the positions of said first and second switch arms are respectively conditioned, a lever actuated in position of said sequential control to affect the position of said third switch arm only during said washing operation, said third switch arm and said first switch arm energizing said first electro-responsive means to supply only water of relatively high temperature to said machine during said washing operation when said cam means is in said first position, and said first, second, and third switch arms energizing both said first and second electro-responsive means to simultaneously supply water of both relatively high and low temperatures to said machine during said washing operation when said cam means is in said second position.

3. In combination, a sequential control for an automatic washing machine, said control embodying a rotatable controlling means for effecting a series of timed operations including a washing operation and a rinsing operation, a timing motor, driving connection means between said motor and said control for rotating said rotatable controlling means, a pair of electro-responsive valve means for connection in hot and cold water service lines respectively to control the supply of relatively hot water or relatively cool water to said machine depending upon the operation of said valve means, energization circuits for said valve means respectively which when energized and de-energized effect the operation of their respective valve means to control the flow of water to said machine, switch means for controlling the energization and de-energization of said circuits including three resilient switch arms, manual control means associated with said sequential control and movable optionally to a first position for setting two of said switch arms for conditioning the circuit for said relatively hot water supply means for energization to supply hot water to said machine, or to a second position for setting said two switch arms and the third switch arm to condition both said circuits for said hot water and cool water supply means for energization for simultaneous operation to supply cooler water to said machine, a pivotally mounted lever co-operating with said manual control means in the setting of said switch arms to effect the aforesaid controls of said relatively hot and cool water supply means, and cam means carried by said rotatable controlling means for effecting operation of said lever only during the washing operation for operating said switch arms to effect the aforesaid controlling operations of said valve means to supply either hot water or said cooler water depending upon the setting of said manual control means.

4. In combination with a sequential control, a switch having three contact carrying switch arms, a cam engageable with two of said arms for selectively positioning the same to establish a control circuit, manually operable means for adjusting the position of said cam, and means actuated by said sequential control independently of said cam for varying the position of a third one of said switch arms to establish a plurality of additional circuits.

HAROLD A. JONES.

REFERENCES CITED

The following references are of record in the file of this patent:

UNITED STATES PATENTS

| Number | Name | Date |
|---|---|---|
| 1,105,448 | Naville | July 28, 1914 |
| 1,404,604 | Hajek | Jan. 24, 1922 |
| 1,892,833 | Gilbert | Jan. 3, 1933 |
| 1,969,926 | Eickhoff | Aug. 14, 1934 |
| 2,020,654 | Houghland | May 12, 1936 |
| 2,194,587 | Brown et al. | Mar. 26, 1940 |
| 2,227,077 | Geldhof | Dec. 31, 1940 |
| 2,278,769 | Chayie | Apr. 7, 1942 |
| 2,302,923 | Zimarek | Nov. 24, 1942 |
| 2,374,590 | Dunham | Apr. 24, 1945 |
| 2,421,986 | Bohman | June 10, 1947 |
| 2,498,885 | Geldhof | Feb. 28, 1950 |